(12) United States Patent
Chithambaram

(10) Patent No.: US 8,271,961 B1
(45) Date of Patent: Sep. 18, 2012

(54) METHOD AND SYSTEM FOR PREDICTIVE SOFTWARE SYSTEM QUALITY MEASUREMENT

(75) Inventor: Nemmara Chithambaram, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 1070 days.

(21) Appl. No.: 12/190,967

(22) Filed: Aug. 13, 2008

(51) Int. Cl.
*G06F 9/44* (2006.01)
(52) U.S. Cl. ......................................................... 717/132
(58) Field of Classification Search ........................ None
See application file for complete search history.

(56) References Cited

U.S. PATENT DOCUMENTS

| | | | | |
|---|---|---|---|---|
| 5,539,652 | A * | 7/1996 | Tegethoff | 703/14 |
| 5,857,112 | A * | 1/1999 | Hashemi et al. | 710/8 |
| 6,128,773 | A * | 10/2000 | Snider | 717/132 |
| 6,557,120 | B1 * | 4/2003 | Nicholson et al. | 714/38.13 |
| 2004/0138852 | A1 * | 7/2004 | Everts et al. | 702/179 |
| 2007/0226546 | A1 * | 9/2007 | Asthana et al. | 714/47 |

* cited by examiner

*Primary Examiner* — Philip Wang
(74) *Attorney, Agent, or Firm* — Park, Vaughan, Fleming & Dowler LLP

(57) ABSTRACT

Some embodiments of the present invention provide a system that measures the quality of a software system. During operation, the system performs a series of stress tests on the software system and determines a set of failure rates for the software system from the stress tests. Next, the system obtains a failure distribution from the failure rates. Finally, the system assesses the quality of the software system based on characteristics of the failure distribution.

24 Claims, 3 Drawing Sheets

METHOD AND SYSTEM FOR PREDICTIVE SOFTWARE SYSTEM QUALITY MEASUREMENT

BACKGROUND

Related Art

Embodiments of the present invention relate to techniques for measuring software system quality.

The quality of a software system, such as an enterprise application or web application, may be assessed in terms of reliability and availability. Reliability corresponds to the probability that the software system continues to function for a given period of time without failure. Indicators of reliability may include parameters such as a mean time between failures (MTBF), a mean time to repair (MTTR), and a failure rate, which is inversely proportional to the MTBF. Availability corresponds to the proportion of time during which the software system is operational. Availability may be determined by dividing the uptime of the software system by the sum of the uptime and downtime of the software system. Availability may also be calculated by dividing the MTBF by the sum of the MTBF and the MTTR of the software system.

Software system quality may be predicted by running and analyzing stress tests on the software system. However, current techniques for analyzing stress tests typically involve subjective evaluation of the software system's reliability, availability, and/or other software quality factors. In addition, data generated by such analysis techniques may not correlate well with the quality of the software system. Such techniques may also be unable to determine a level of redundancy required in the software system for a given availability requirement. Hence, the tasks of developing, updating, and deploying software systems may be facilitated by techniques that can accurately assess the quality, reliability, and/or availability of the software systems.

SUMMARY

Some embodiments of the present invention provide a system that measures the quality of a software system. During operation, the system performs a series of stress tests on the software system and determines a set of failure rates for the software system from the stress tests. Next, the system obtains a failure distribution from the failure rates. Finally, the system assesses the quality of the software system based on characteristics of the failure distribution.

In some embodiments, assessing the quality of the software system involves obtaining an availability requirement for the software system and determining a level of redundancy for the software system based on the assessed quality and the availability requirement.

In some embodiments, the level of redundancy is determined by:
(i) obtaining a point on the failure distribution;
(ii) calculating a tangent of the failure distribution at the point; and
(iii) calculating an intercept of the tangent, wherein the level of redundancy is based on the intercept.

In some embodiments, the stress tests are performed throughout a development cycle of the software system.

In some embodiments, the failure rates are calculated from mean times before failures (MTBFs) for the software system.

In some embodiments, the failure distribution corresponds to a bathtub curve.

In some embodiments, the characteristics include at least one of a first derivative of the bathtub curve, a second derivative of the bathtub curve, an inflection point on the bathtub curve, and an intercept of a tangent at the inflection point.

In some embodiments, the stress tests correspond to accelerated life tests.

DETAILED DESCRIPTION

Figure 1:
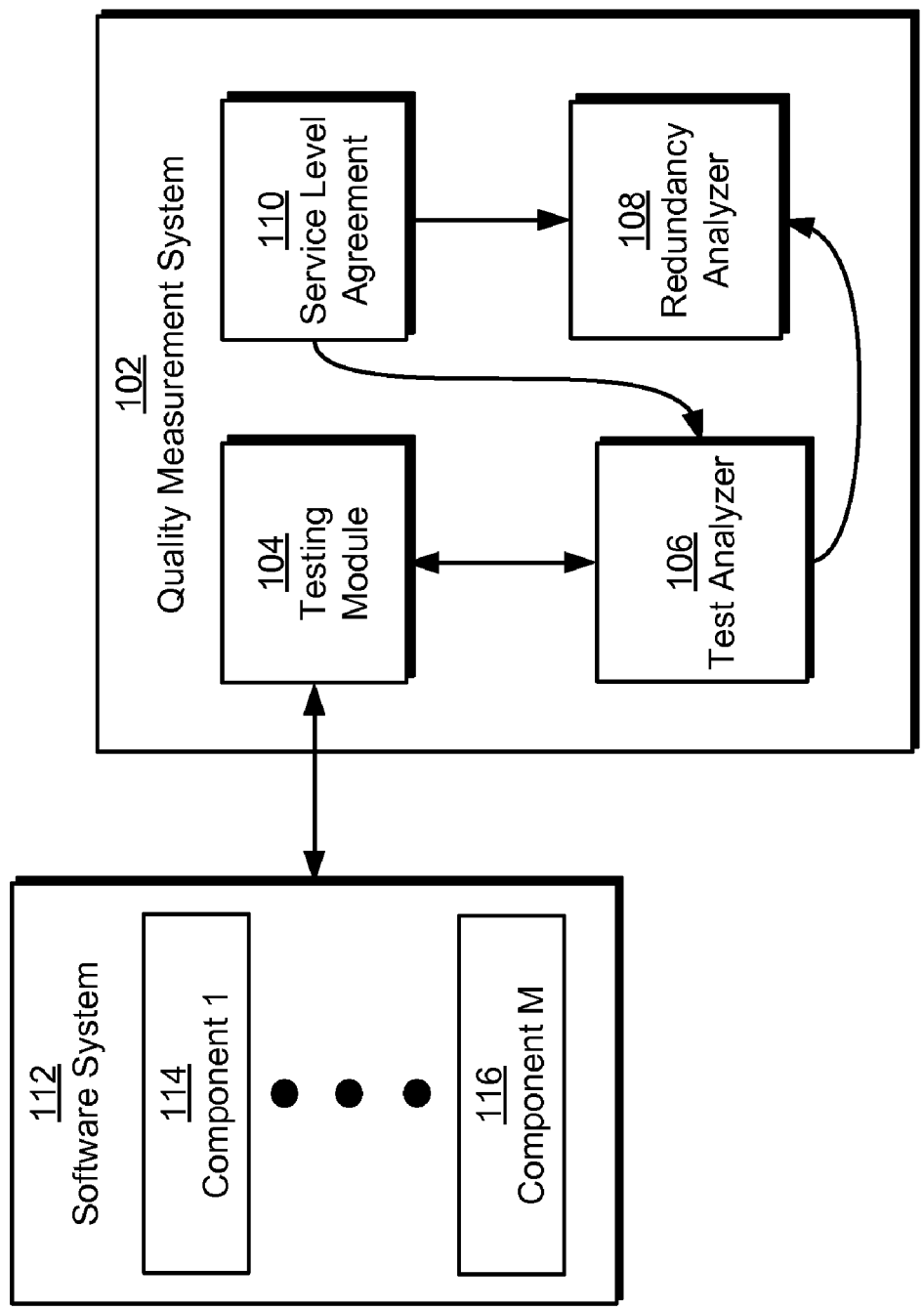
FIG. 1 shows a schematic of a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the present invention provide a method and system for measuring the quality of a software system. More specifically, embodiments of the present invention provide a method and system for predictive measurement of software system quality. The quality of the software system may be measured by running a series of stress tests on the software system and calculating a set of failure rates for the software system from the stress tests. A failure distribution may then be obtained from the failure rates and the quality of the software system assessed based on characteristics of the failure distribution.

In one or more embodiments of the invention, the failure distribution corresponds to a bathtub curve. Furthermore, the characteristics of the bathtub curve may include a first derivative of the bathtub curve, a second derivative of the bathtub curve, an inflection point on the bathtub curve, and an intercept of a tangent at the inflection point.

FIG. 1 shows a schematic of a system in accordance with an embodiment of the present invention. More specifically, FIG. 1 shows a schematic of a quality measurement system 102 that is used to measure the quality of a software system 112. As shown in FIG. 1, quality measurement system 102 includes a testing module 104, a test analyzer 106, a redundancy analyzer 108, and a service level agreement 110. Each of these components is described in further detail below.

Software system 112 may correspond to a standalone application, application suite, operating system, enterprise software solution, database, web application, and/or other type of software. In addition, software system 112 may be executed in a variety of environments. For example, software system 112 may be executed on a single desktop computer or workstation, or software system 112 may be distributed across multiple servers (e.g., load-balanced servers) within a data center.

As shown in FIG. 1, software system 112 includes multiple components (e.g., component l 114, component m 116). Each component may correspond to an individual software module that performs specific tasks within software system 112. For example, an enterprise solution may include one or more targets corresponding to databases, business logic layers, user interfaces, network configurations, middleware, and/or other parts of the enterprise solution. In addition, the functionality of software system 112 may be produced by the interaction of the components with one another. For example, an enterprise solution for processing financial transactions may include one or more databases for storing data related to financial accounts, financial transactions, and users; business logic and middleware for performing financial transactions; and a user interface to allow users to access and use the enterprise solution.

Software system 112 is also associated with a service level agreement (SLA) 110. SLA 110 may define a set of acceptance criteria for software system 112. For example, SLA 110 may provide a specified level of service, support options, enforcement or penalty provisions for services not provided, a guaranteed level of downtime or uptime, a specified level of customer support, and/or a list of services or functions provided by software system 112. SLA 110 may also include requirements or guidelines for software quality factors such as reliability, availability, security, mean time between failures (MTBF), and/or mean time to repair (MTTR).

In one or more embodiments of the invention, software system 112 corresponds to a high availability software system. In other words, software system 112 may be subject to an availability requirement included in SLA 110. The availability requirement may be stated as a number of "nines." For example, an availability of three nines corresponds to 99.9% availability, or an allowable downtime of 8.76 hours a year. An availability of four nines corresponds to 99.99% availability, or an allowable downtime of 52.6 minutes a year. An availability of five nines corresponds to 99.999% availability, or an allowable downtime of 5.26 minutes a year. The availability requirement may be used to determine a level of redundancy for software system 112, as described below.

In one or more embodiments of the invention, quality measurement system 102 analyzes the quality of software system 112 in terms of SLA 110. As with software system 112, quality measurement system 102 may be executed in various environments. For example, quality measurement system 102 may be executed using the same machine(s) as software system 112 (e.g., on a hosted deployment environment), or quality measurement system 102 may run on one or more hosts that communicate with software system 112 using a network connection.

To assess the quality of software system 112, testing module 104 may perform a series of stress tests on software system 112. In one or more embodiments of the invention, the stress tests correspond to accelerated life tests. In other words, the stress tests may place loads on software system 112 that are equivalent to loads experienced over weeks, months, or a year in production. For example, a stress test that lasts for five days and simulates a year's load in production may trigger operations on software system 112 at 73 times the load factor of operations encountered during production.

To generate increased load conditions, testing module 104 may simulate hundreds or thousands of concurrent users every second. Each simulated user may also perform a mix of requests (e.g., read, write, create, complex query, etc.) on software system 112. Furthermore, stress tests may be executed on components (e.g., component l 114, component m 116) of software system 112 based on failure mode and effects analysis (FMEA). In particular, stress tests may be structured around components that are most likely to fail, are used frequently, and/or are associated with a high severity upon failure.

During a stress test, components within software system 112 that are likely to fail under stress may be monitored for degradation beyond acceptable limits. For example, testing module 104 may monitor parameters associated with the components such as memory usage, garbage collection time, active thread counts, active connections, message transmission rates, connection times, error rates, network latency, and/or resource overload. Limits of acceptability for each parameter may be obtained from acceptance criteria in SLA 110 and/or otherwise specified. Furthermore, events in which unacceptable levels of degradation are found may constitute failures, or downtime, in software system 112.

Results from the stress tests may then be analyzed by test analyzer 106 to determine the quality of software system 112. More specifically, test analyzer 106 may determine a set of failure rates for software system 112 from the stress tests. To determine the failure rates, test analyzer 106 may analyze data collected during each stress test to determine periods of uptime and downtime within the testing period. Test analyzer 106 may then obtain an MTBF of software system 112 from the stress test as the sum of successive periods of uptime during the stress test divided by the number of failures experienced during the stress test. For example, if a stress test runs for a week and software system 112 is up for six periods of 20 hours each and experiences five failures in between the periods, the MTBF for the stress test may be calculated as 6*20/5, or 24 hours. The failure rate may then be calculated as the reciprocal of the MTBF, or one failure per day.

Test analyzer 106 may also obtain a failure distribution from the failure rates. In particular, stress tests may be performed on software system 112 by testing module 104 throughout the development cycle of software system 112. For example, stress tests may be performed periodically and/or as components of software system 112 are added, fixed, or updated. The failure distribution may then be obtained by examining changes in the failure rate of software system 112 as the development cycle progresses.

In one or more embodiments of the invention, the failure distribution for software system 112 corresponds to a bathtub curve. In other words, the failure rate of software system 112 may initially decrease as software system 112 is developed and improved. Next, the failure rate may reach an inflection point (i.e., minimum) and remain near the inflection point for a period of time. Finally, the failure rate may increase as software system 112 ages and/or becomes obsolete. The bathtub curve is described in further detail below with respect to FIG. 2.

To assess the quality of software system 112, test analyzer 106 may examine characteristics of the failure distribution (i.e., bathtub curve). The characteristics may include a first derivative of the bathtub curve, a second derivative of the bathtub curve, an inflection point on the bathtub curve, and/or an intercept of a tangent at the inflection point. The characteristics may be determined by fitting the failure rates of software system 112 to a curve (e.g., using regression analysis) and examining properties of the curve. Alternatively, the characteristics may be estimated directly from the failure rates. For example, the first derivative at a point on the failure distribution may be estimated by calculating the slope of the line created by two failure rates closest to the point.

In one or more embodiments of the invention, assessing the quality of software system 112 includes determining a level of redundancy for software system 112. In one or more embodiments of the invention, redundancy analyzer 108 determines the level of redundancy by obtaining an availability requirement for software system 112 from SLA 110. The level of redundancy required in software system 112 is then based on the assessed quality of software system 112 and the availability requirement.

More specifically, redundancy analyzer 108 may determine the level of redundancy by obtaining a point on the failure distribution and calculating a tangent (i.e., slope) of the failure distribution at that point. The point may correspond to the inflection point of the failure distribution. Alternatively, if software system 112 has not reached the inflection point, the point may be taken as the point corresponding to the current stage of development of software system 112. Redundancy analyzer 108 may then calculate an intercept of the tangent and use the intercept as a linear measure of the redundancy needed in software system 112.

In other words, the intercept may indicate the quality of software system 112 at a time corresponding to the point on the failure distribution. A lower value for the intercept may correspond to fewer failures and higher quality, which in turn requires less redundancy to achieve a given availability requirement. On the other hand, a higher value for the intercept may correspond to more failures and lower quality, which suggests that more redundancy may be required to achieve a given availability requirement.

Figure 2:
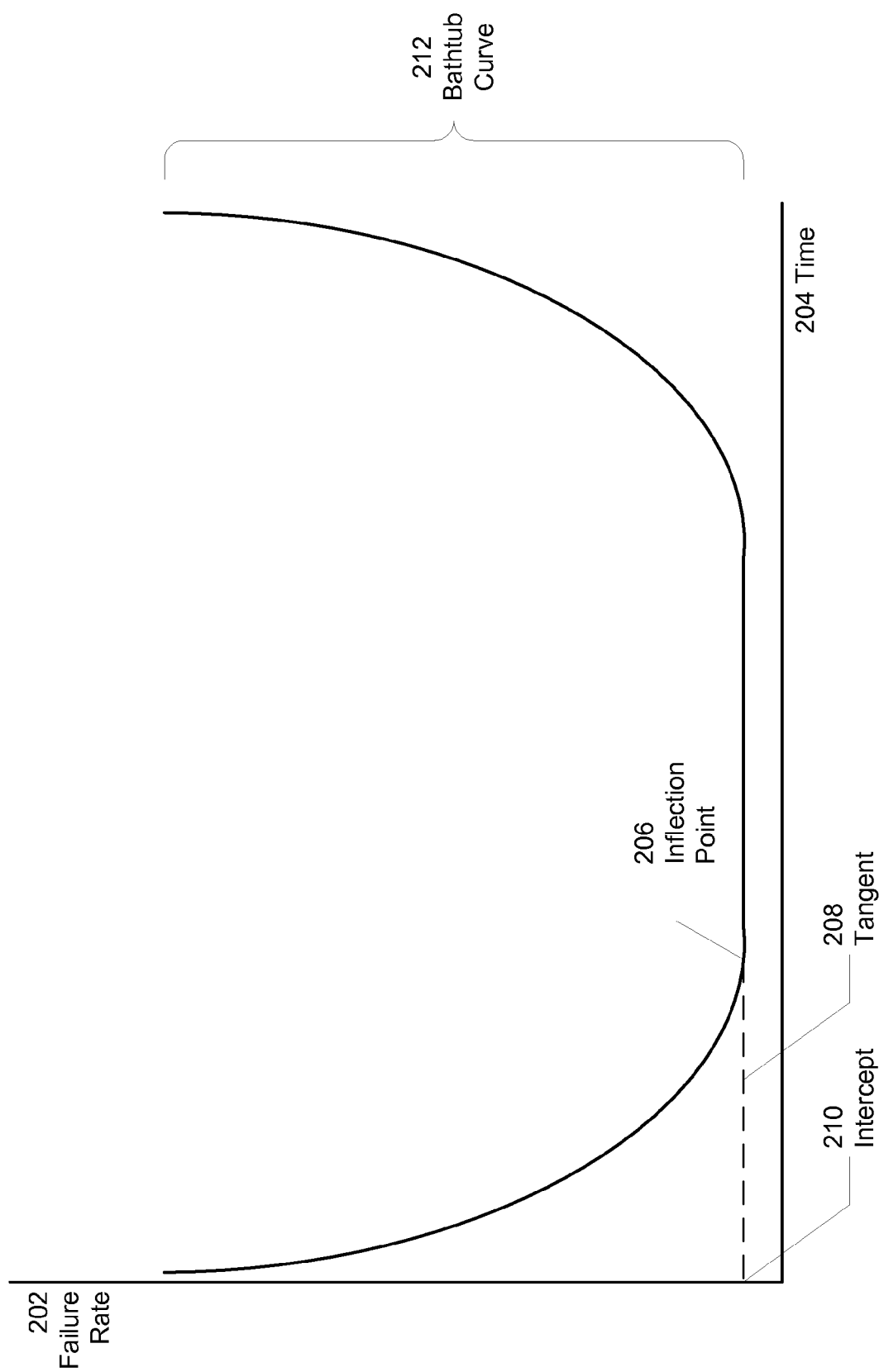
FIG. 2 shows a failure distribution in accordance with an embodiment of the present invention.

FIG. 2 shows a failure distribution in accordance with an embodiment of the present invention. As described above, the failure distribution may correspond to a bathtub curve 212. Furthermore, bathtub curve 212 is plotted as a failure rate 202 of a software system (e.g., software system 112 of FIG. 1) over time 204. Consequently, failure rate 202 may decline as the software system is developed and improved and may level off during the useful life of the software system. Moreover, failure rate 202 may increase as the software system ages and/or becomes obsolete.

In one or more embodiments of the invention, bathtub curve 212 is obtained by performing stress tests on the software system at various points during the development cycle of the software system. For example, stress tests may be performed periodically (e.g., weekly, monthly, bimonthly) and/or as new features or fixes are implemented. Failure rates of the software system may be obtained from the stress tests and used to obtain bathtub curve 212. Furthermore, bathtub curve 212 may be fit to the failure rates using techniques such as regression analysis.

As shown in FIG. 2, bathtub curve 212 includes an inflection point 206. Inflection point 206 may be determined by examining the first and/or second derivatives of bathtub curve 212. For example, inflection point 206 may be taken as the point along bathtub curve 212 at which the first derivative (i.e., slope) of bathtub curve 212 changes from negative to zero or positive.

A tangent 208 of bathtub curve 212 may also be taken at inflection point 206. Tangent 208 may be obtained by examining the first derivative of bathtub curve 212 at inflection point 206. Finally, an intercept 210 of tangent 208 may be calculated from tangent 208 by examining the intersection of tangent 208 with the axis for failure rate 202. Intercept 210 may serve as a measure of the level of redundancy required in the software system to achieve a certain level of availability (e.g., availability requirement). For example, a lower level of redundancy may be needed if intercept 210 is small (indicating a low failure rate) and/or the availability requirement is low. On the other hand, a high level of redundancy may be needed if intercept 210 is large (indicting a high failure rate) and/or the availability requirement is high. As a result, the software system may require a higher level of redundancy for a given availability requirement prior to inflection point 206 than at inflection point 206. Similarly, a high value for intercept 210 at inflection point 206 may indicate that the software system is not fully developed or ready for deployment.

Figure 3:
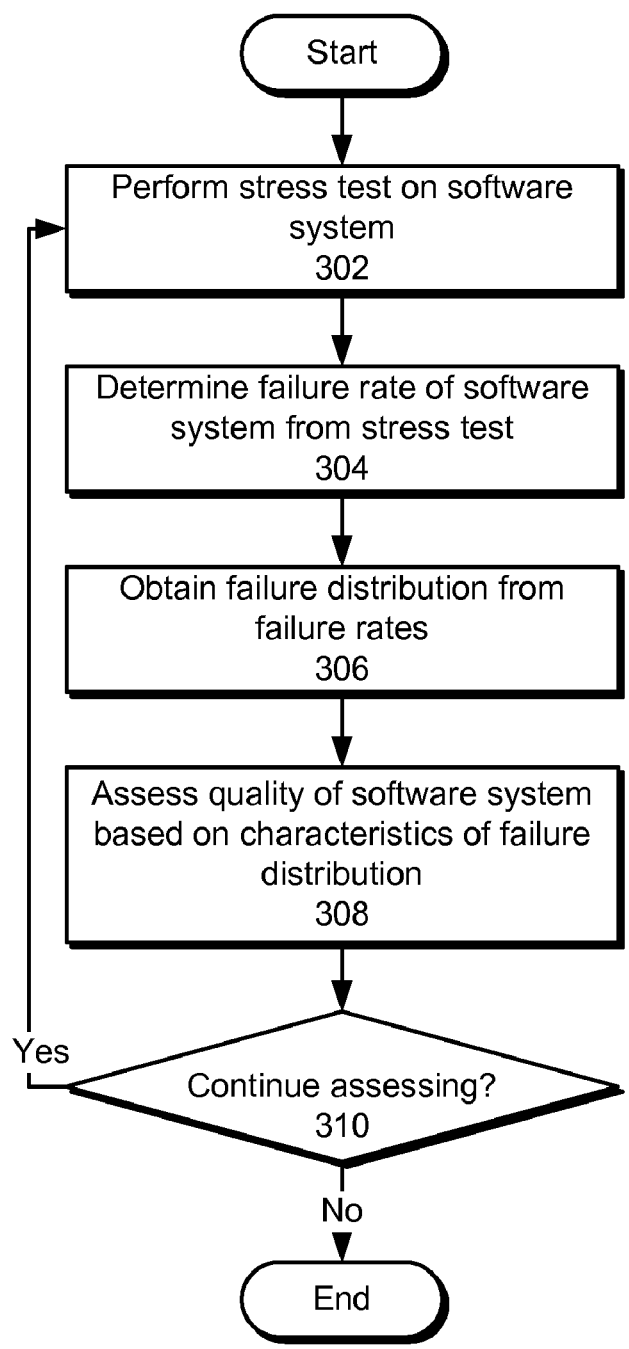
FIG. 3 shows a flowchart illustrating the process of measuring the quality of a software system in accordance with an embodiment of the present invention.

FIG. 3 shows a flowchart illustrating the process of measuring the quality of a software system in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a stress test is performed on a software system (operation 302). The stress test may correspond to an accelerated life test. In particular, the stress test may apply a load to the software system that simulates hundreds of concurrent users performing a mix of operations on the software system over a period of time (e.g., five days). Next, the failure rate of the software system is calculated from the stress test (operation 304). The failure rate may be calculated as the reciprocal of the MTBF of the software system as determined from the stress test. The MTBF may be determined by dividing the total uptime of the software system during the stress test by the number of failures encountered during the stress test.

A failure distribution may then be obtained from the failure rate (operation 306) of the stress test and any other stress tests performed on the software system. As described above, the failure distribution may correspond to a bathtub curve that models the progression of failure rates over time. Furthermore, the bathtub curve may be fit to the failure rates using regression analysis and/or other curve-fitting techniques. The quality of the software system is then assessed based on the characteristics of the failure distribution (operation 308). The characteristics may include a first derivative, second derivative, inflection point, and/or an intercept of the tangent at the inflection point.

In particular, the quality of the software system may be assessed to determine a level of redundancy for the software system based on an availability requirement (e.g., a certain number of nines). The level of redundancy may be determined by obtaining a point (e.g. inflection point) on the failure distribution, calculating the tangent of the failure distribution at the point, and calculating an intercept of the tangent. The intercept may correspond to both an indicator of the software system's quality and a linear measure of redundancy required in the software system to achieve the availability requirement; a high value for the intercept indicates more redundancy is required, while a low value for the intercept indicates less redundancy is required. The actual amount of redundancy required may then be determined by applying empirical data and/or deploying the software system to a representative cluster.

The software system may continue to be assessed (operation 310) over time and/or as components of the software system are added, changed, or updated. If assessment of the software continues, stress tests are performed on the software system (operation 302) and failure rates for the software system are determined from the stress tests (operation 304). For example, stress tests may be performed during releases, updates, and/or bug fixes. Stress tests may also be performed periodically. The failure distribution is updated using the failure rates (operation 306) and the quality of the software system is assessed based on the characteristics of the failure distribution (operation 308). Assessment of the software system may be discontinued if the software system is no longer supported or used.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for measuring the quality of a software system, comprising:
    performing a series of stress tests on the software system;
    determining a set of failure rates for the software system from the stress tests;
    obtaining a failure distribution from the failure rates;
    assessing the quality of the software system based on characteristics of the failure distribution; and
    determining a level of redundancy for the software system based on the assessed quality and an availability requirement for the software system, wherein determining the level of redundancy comprises:
        obtaining a point on the failure distribution; and
        calculating a tangent of the failure distribution at the point.

2. The method of claim 1, wherein assessing the quality of the software system involves:
    obtaining the availability requirement for the software system.

3. The method of claim 1, wherein determining the level of redundancy further comprises:
    calculating an intercept of the tangent, wherein the level of redundancy is based on the intercept.

4. The method of claim 1, wherein the stress tests are performed throughout a development cycle of the software system.

5. The method of claim 1, wherein the failure rates are calculated from mean times before failures (MTBFs) for the software system.

6. The method of claim 1, wherein the failure distribution corresponds to a bathtub curve.

7. The method of claim 6, wherein the characteristics include at least one of a first derivative of the bathtub curve, a second derivative of the bathtub curve, an inflection point on the bathtub curve, and an intercept of a tangent at the inflection point.

8. The method of claim 1, wherein the stress tests correspond to accelerated life tests.

9. A system for measuring the quality of a software system, comprising:
    a processor;
    a test module configured to perform a series of stress tests on the software system;
    a test analyzer configured to:
        determine a set of failure rates for the software system from the stress tests;
        obtain a failure distribution from the failure rates; and
        assess the quality of the software system based on characteristics of the failure distribution; and
    a redundancy analyzer configured to determine a level of redundancy for the software system based on the assessed quality and an availability requirement for the software system, wherein, while determining the level of redundancy, the redundancy analyzer is configured to:
        obtain a point on the failure distribution; and
        calculate a tangent of the failure distribution at the point.

10. The system of claim 9, wherein the redundancy analyzer is further configured to:
    obtain the availability requirement for the software system.

11. The system of claim 9, wherein, while determining the level of redundancy, the redundancy analyzer is further configured to calculate an intercept of the tangent, wherein the level of redundancy is based on the intercept.

12. The system of claim 9, wherein the stress tests are performed throughout a development cycle of the software system.

13. The system of claim 9, wherein the failure rates are calculated from mean times before failures (MTBFs) for the software system.

14. The system of claim 9, wherein the failure distribution corresponds to a bathtub curve.

15. The system of claim 14, wherein the characteristics include at least one of a first derivative of the bathtub curve, a second derivative of the bathtub curve, an inflection point on the bathtub curve, and an intercept of a tangent at the inflection point.

16. The system of claim 9, wherein the stress tests correspond to accelerated life tests.

17. A non-transitory computer-readable storage medium storing instructions that when executed by a computer cause the computer to perform a method for measuring the quality of a software system, the method comprising:
    performing a series of stress tests on the software system;
    determining a set of failure rates for the software system from the stress tests;
    obtaining a failure distribution from the failure rates;
    assessing the quality of the software system based on characteristics of the failure distribution; and
    determining a level of redundancy for the software system based on the assessed quality and an availability requirement for the software system, wherein determining the level of redundancy comprises:
        obtaining a point on the failure distribution; and
        calculating a tangent of the failure distribution at the point.

18. The computer-readable storage medium of claim 17, wherein assessing the quality of the software system involves:
    obtaining the availability requirement for the software system.

19. The computer-readable storage medium of claim 17, wherein determining the level of redundancy further comprises:

calculating an intercept of the tangent, wherein the level of redundancy is based on the intercept.

20. The computer-readable storage medium of claim 17, wherein the stress tests are performed throughout a development cycle of the software system.

21. The computer-readable storage medium of claim 17, wherein the failure rates are calculated from mean times before failures (MTBFs) for the software system.

22. The computer-readable storage medium of claim 17, wherein the failure distribution corresponds to a bathtub curve.

23. The computer-readable storage medium of claim 22, wherein the characteristics include at least one of a first derivative of the bathtub curve, a second derivative of the bathtub curve, an inflection point on the bathtub curve, and an intercept of a tangent at the inflection point.

24. The computer-readable storage medium of claim 17, wherein the stress tests correspond to accelerated life tests.

* * * * *